United States Patent Office 2,697,109
Patented Dec. 14, 1954

2,697,109

16-NITROMETHYLPREGNEN-20-ONES AND PROCESS

Raymond M. Dodson, Park Ridge, Ill., assignor to G. D. Searle & Co., Chicago, Ill., a corporation of Illinois No Drawing. Application June 19, 1953,
Serial No. 362,955

9 Claims. (Cl. 260—397.3)

The present invention relates to a new group of polycyclic nitrocompounds and, specifically, to steroids containing a nitromethyl group in position 16. Compounds with which this invention is particularly concerned are the 16-nitromethylpregnen-20-ones, substituted in the 3-position by a member of the class consisting of oxo, hydroxy, benzoyloxy and (lower alkyl)-COO— radicals, wherein the lower alkyl radicals can be methyl, ethyl, straight and branched chain propyl, butyl, amyl and hexyl radicals.

These compounds are of therapeutic value because of their hormonal action, particularly as androgens, estrogens and ovulation inhibitors. They are also of value as intermediates in the organic synthesis of other medicinal compounds with hormonal action. Valuable 16-aminomethyl compounds are obtained by a selective reduction of the nitro group with iron and acetic acid. The aminomethyl compounds thus obtained also yield valuable products when treated with acetic acid and nitrous acid. Thus treatment of 3-acetoxy-16-aminomethyl-5-pregnen-20-one with acetic acid and sodium nitrite followed by deacetylation with sodium hydroxide, yields a mixture of products containing 3-hydroxy-D-homo-5,17-pregnadien-20-one, the 16α- and 16β-isomers of 3,16-dihydroxy-D-homo-5-pregnen-20-one, 3-hydroxy-16-hydroxymethyl-5-pregnen-20-one and two compounds tentatively identified as 3-hydroxy-16-methyl-5,16-pregnadien-20-one and 3-hydroxy-D-homo-5,15-pregnadien-20-one.

The claimed 16-nitromethylpregnen-20-ones are prepared from the corresponding Δ16-pregnen-20-ones by treatment with nitromethane. This reaction is carried out most conveniently in a mild base with an ionization constant greater than 10⁻⁴. Among suitable bases are piperidine, lupetidine and lower trialkylamines. The reaction can also be carried out satisfactorily with stronger bases. However, in the cases where the 3-hydroxy group of the starting material is esterified these strong bases cause deesterification and it is therefore necessary to re-esterify the 3-hydroxy group with the corresponding acid chloride or anhydride where an ester is desired.

The compounds which constitute my invention and the methods for their preparation will appear more fully from the consideration of the following examples. However, my invention is not to be construed as limited by the details set forth in spirit or in scope. In these examples temperatures are indicated in degrees centigrade (° C.) and quantities of materials in parts by weight.

Example 1

A mixture of 356 parts of 3-acetoxy-5,16-pregnadien-20-one, 3500 parts of nitromethane and 600 parts of anhydrous piperidine is maintained at room temperature for 5 days, concentrated to a small volume under vacuum and diluted with ether. The resulting solution is washed thoroughly first with dilute potassium hyroxide and then with dilute hydrochloric acid, dried over anhydrous sodium sulfate, filtered and evaporated. Crystallization from a mixture of petroleum ether and benzene using charcoal decolorization yields 3-acetoxy-16-nitromethyl-5-pregnen-20-one melting at about 148–149.5° C. An 0.32% chloroform solution shows a specific rotation of $[\alpha]_D = +5°$. This compound has the structural formula

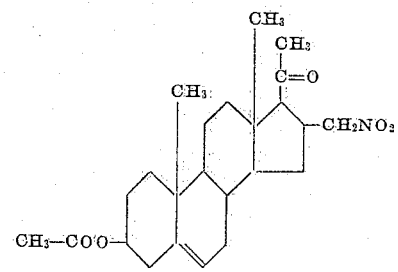

Example 2

To a solution of 24.3 parts of 3-acetoxy-16-nitromethyl-5-pregnen-20-one in 800 parts of methanol, a solution of 20 parts of potassium hydroxide in 150 parts of water is added. After slight heating to effect solution, the mixture is permitted to stand at room temperature for 5 hours. A small quantity of insoluble material is then removed by filtration and the filtrate is neutralized with acetic acid. The resulting precipitate of 3-hydroxy-16-nitromethyl-5-pregnen-20-one is collected on a filter and recrystallized from acetone. The product melts at about 225–227° C. A 1% chloroform solution shows a specific rotation of $[\alpha]_D = +18°$. The product has the structural formula

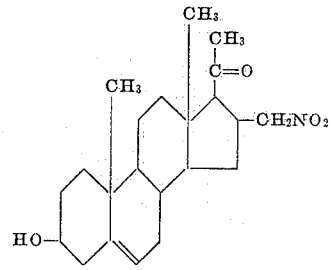

The identical product is obtained when 31 parts of 3-hydroxy-5,16-pregnadien-20-one are treated with 550 parts of nitromethane and 120 parts of anhydrous piperidine by the method of Example 1. A mixed melting point test shows no depression in melting point.

Example 3

A solution of 39 parts of 3-hydroxy-16-nitromethyl-5-pregnen-20-one in 520 parts of toluene is concentrated to one half of its original volume and then heated under reflux for 2 hours with 185 parts of cyclohexanone and a solution of 30 parts of aluminum isopropoxide in 110 parts of toluene. The reaction mixture is then poured into 1000 parts of a Rochelle salt solution and submitted to steam distillation. The residue is filtered and the 16-nitromethyl-4-pregnene-3,20-dione thus collected is crystallized first from dilute methanol and then from a mixture of ethyl acetate and cyclohexane. Crystals melt at about 143–144° C. The specific rotation of a 1% chloroform solution is $[\alpha]_D = +145°$.

The same product is obtained by treatment of 31 parts of 4,16-pregnadien-3,20-dione with 400 parts of nitromethane and 80 parts of anhydrous piperidine by the method of Example 1. The product thus obtained, crystallized from a mixture of benzene and cyclohexane, melts at about 142–144° C. The product has the structural formula

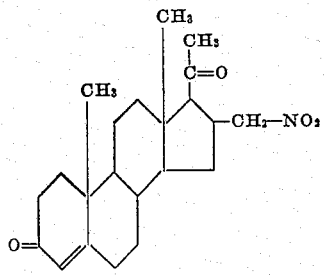

Example 4

A mixture of 21 parts of 3-acetoxy-16-nitromethyl-5-pregnen-20-one, 30 parts of iron filings, 200 parts of acetic acid and 600 parts of water is heated under reflux for 4 hours and then filtered. The ferrous hydroxide and the desired amine are precipitated by addition of ammonium hydroxide. The precipitate is separated by filtration through a silica filter aid, dried and pulverized. The powder is extracted exhaustively with benzene. The benzene solution is filtered and thoroughly extracted with 10% acetic acid. This extract is made alkaline by addition of ammonium hydroxide. The resulting precipitate is collected on a filter, dried in an oven and crystallized from dilute methanol. The 3-acetoxy-16-aminomethyl-5-pregnen-20-one thus obtained melts at about 162–163° C. with resolidification of the melt. It has the structural formula

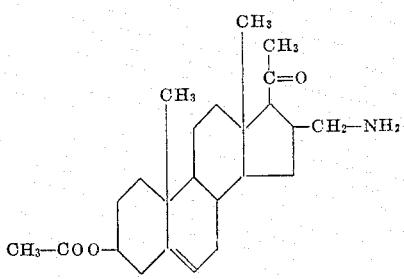

Example 5

A solution of 186 parts of 3-acetoxy-16-aminomethyl-5-pregnen-20-one in 1000 parts of pyridine is treated with 1080 parts of acetic anhydride, permitted to stand for 10 hours and then poured into cold water. The resulting precipitate is collected on a filter and crystallized from dilute methanol. The 3-acetoxy-16-acetaminomethyl-5-pregnen-20-one thus obtained melts at about 167–170° C. It has the structural formula

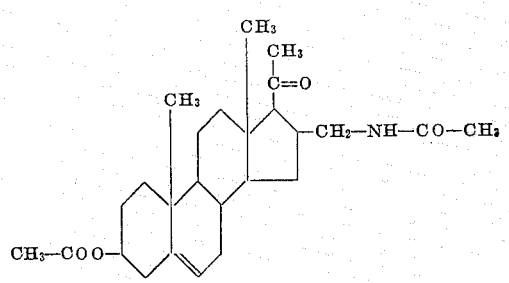

Example 6

A solution of 2 parts of 3-acetoxy-16-amino-methyl-5-pregnen-20-one in 80 parts of methanol and 2 parts of potassium hydroxide in 10 parts of water is heated at reflux temperature for 2 hours and then filtered. The filtrate is poured into water and the 3-hydroxy-16-aminomethyl-5-pregnen-20-one is salted out by addition of sodium chloride. After crystallization from a mixture of benzene, ethanol and cyclohexane, and then from highly dilute methanol, crystals are obtained which melt at about 189–191° C. with resolidification. The identical product is obtained by treatment of 3-hydroxy-16-nitromethyl-5-pregnen-20-one with iron and acetic acid by the procedure of Example 4. The compound has the structural formula

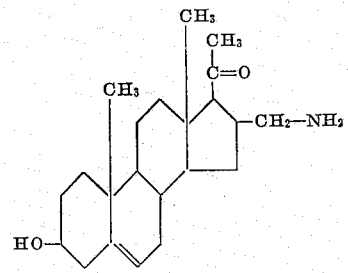

Example 7

A solution of 5 parts of 3-acetoxy-16-acetaminomethyl-5-pregnen-20-one in 200 parts of methanol is treated with a solution of 5 parts of potassium hydroxide in 50 parts of water. After standing for 10 hours at room temperature, the reaction mixture is filtered and the filtrate is neutralized with 5 parts of dilute acetic acid, heated and diluted with water. Upon cooling the 3-hydroxy-16-acetaminomethyl-5-pregnen-20-one precipitates, which, recrystallized from dilute methanol, melts at about 232–233° C. A 1% chloroform solution shows a specific rotation of $[\alpha]_D = +6°$.

Example 8

A solution of 24.3 parts of 3-hydroxy-16-acetaminomethyl-5-pregnen-20-one in 865 parts of toluene and 280 parts of cyclohexanone is concentrated to 42% of its original volume and then treated with a solution of 30 parts of aluminum isopropoxide in 130 parts of toluene. After being heated under reflux for one-half hour, the mixture is poured into 1000 parts of a saturated Rochelle salt solution. This solution is then extracted with ethyl acetate and the ethyl acetate extract is washed with Rochelle salt solutions. The Rochelle salt solutions are once more extracted with ethyl acetate and the organic layers are combined and washed thoroughly with water. Concentration to a small volume and dilution with petroleum ether causes precipitation of 16-acetaminomethyl-4-pregnene-3,20-dione which, recrystallized from dilute methanol, melts at about 219–220° C.

Example 9

A solution of 43 parts of 3-benzoyloxy-5,16-pregnadien-20-one, 500 parts of nitromethane and 200 parts of anhydrous piperidine is maintained at 25° C. for 100 hours, warmed to 50° C. and then evaporated under vacuum to a small volume. The residue is diluted with ether and benzene. This solution is washed thoroughly with dilute potassium hydroxide and then with hydrochloric acid to remove all of the nitromethane and piperidine remaining. The residue is dried over anhydrous sodium sulfate, stirred with decolorizing charcoal, filtered and evaporated to yield the 3-benzoyloxy-16-nitromethyl-5-pregnen-20-one. The compound is readily crystallized from ethyl acetate or acetone. It shows a double melting point; it first melts at about 205–207° C., resolidifies, and melts again at about 211–212° C. The compound has the structural formula

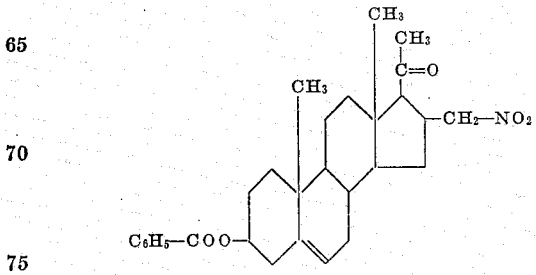

Example 10

97 parts of 3-acetoxy-16-aminomethyl-5-pregnen-20-one are dissolved in a solution of 15.7 parts of acetic acid in 1000 parts of water, treated with a solution of 18 parts of sodium nitrite in 2200 parts of water and heated on the stream bath for 2 hours. The precipitate is collected on a filter, washed thoroughly with water and then dried. A small amount of additional material is obtained from the filtrate.

The neutral products are hydrolyzed by heating for one hour at reflux temperature with 50 parts of potassium hydroxide in 250 parts of water and 1000 parts of methanol. The resulting solution is diluted with water, neutralized with acetic acid and then filtered. The residue is dissolved in a large volume of a 20% solution of ethyl acetate in benzene and applied to a chromatography column containing 6800 parts of silica gel. The unabsorbed material is chromatographed on a second column. Elution of the second column with a 5% solution of ethyl acetate in benzene, concentration of the eluate and crystallization of the residue from dilute acetone and then from benzene yields 3-hydroxy-D-homo-5,17-pregnadien-20-one, melting at about 231–233° C. The ultraviolet absorption spectrum shows a maximum at 233 millimicrons with a molecular extinction coefficient of 8930. Further elution of the column with a 5% solution of ethyl acetate in benzene yields a compound $C_{22}H_{32}O_2$; the ultraviolet absorption spectrum shows a maximum at 251 millimicrons with an extinction coefficient of 6900. This compound is probably impure 3-hydroxy-16-methyl-5,16-pregnadien-20-one.

The first column is washed with 80,000 parts of a 20% solution of ethyl acetate in benzene and then eluated with 60,000 parts of a 40% solution of ethyl acetate in benzene. Concentration of this eluate and crystallization of the residue from dioxane and then from a mixture of benzene and alcohol yields a compound melting at about 273–274.5° C. It shows no appreciable absorption in the ultraviolet spectrum between 220 and 300 millimicrons.

Futher elution of the column with 60,000 parts of a 40% solution of ethyl acetate in benzene, concentration of the eluate and successive crystallizations of the residue from dilute acetone, then from a mixture of benzene and ethanol and finally from dilute methanol, and rechromatography on alumina yields crystals melting at about 217–220° C.

Elution of the column with a 50% solution of ethyl acetate in benzene and then with a 75% solution of ethyl acetate in benzene, evaporation of the eluates and crystallization from acetone yields two crops, the first of which melts at about 192–202° C. and the second of which melts at about 206–209° C. The second crop is crystallized, once from dilute methanol and three times from a mixture of benzene and ethanol. The resulting product melts at about 216–217° C. The specific rotation of a 1% chloroform solution is $[\alpha]_D = -20°$. This product is presumably one of the isomers of 3,16-dihydroxy-D-homo-5-pregnen-20-one.

I claim:

1. A 16-nitromethylpregnen-20-one substituted in the 3-position by a member of the class consisting of oxo, hydroxy, benzoyloxy and (lower alkyl)-COO- radicals.
2. 16-nitromethyl-4-pregnene-3,20-dione.
3. 3-hydroxy-16-nitromethyl-5-pregnen-20-one.
4. A compound of the structural formula

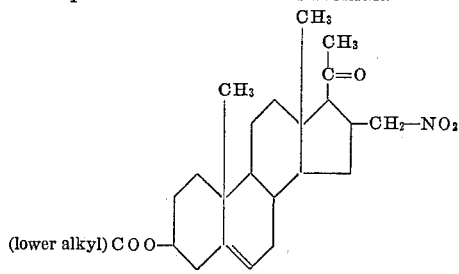

5. 3-acetoxy-16-nitromethyl-5-pregnen-20-one.
6. 3-benzoyloxy-16-nitromethyl-5-pregnen-20-one.
7. The process of preparing a 16-nitromethyl-pregnen-20-one substituted in the 3-position by a member of the class consisting of oxo, hydroxy, benzoyloxy and (lower alkyl)-COO- radicals, which comprises treatment of a steroid of the same structure in rings A, B, and C and of a ring D structure

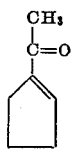

with nitromethane.

8. The process of preparing a 16-nitromethyl-pregnen-20-one substituted in the 3-position by a member of the class consisting of oxo, hydroxy, benzoyloxy and (lower alkyl)-COO- radicals, which comprises treatment of a steroid of the same structure in rings A, B, and C and of a ring D structure

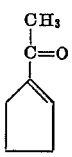

with nitromethane and a base with an ionization constant greater than $10^{-4}$.

9. The process of preparing a 16-nitromethyl-pregnen-20-one position in the 3-position by a member of the class consisting of oxo, hydroxy, benzoyloxy and (lower alkyl)-COO- radicals, which comprises treatment of a steroid of the same structure in rings A, B and C and of a ring D structure

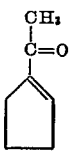

with nitromethane and piperidine.

No references cited.